(12) United States Patent
Schurmans et al.

(10) Patent No.: US 11,061,196 B2
(45) Date of Patent: Jul. 13, 2021

(54) ENCLOSURE WITH RESTRICTED ACCESS REGION

(71) Applicant: CommScope Connectivity Belgium BVBA, Kessel-Lo (BE)

(72) Inventors: Eric Schurmans, Geetbets (BE); Roger Joseph Alaerts, Langdorp (BE)

(73) Assignee: COMMSCOPE CONNECTIVITY BELGIUM BVBA, Kessel-Lo (BE)

(*) Notice: Subject to any disclaimer, the term of this patent is extended or adjusted under 35 U.S.C. 154(b) by 0 days.

(21) Appl. No.: 16/601,030

(22) Filed: Oct. 14, 2019

(65) Prior Publication Data

US 2020/0116964 A1    Apr. 16, 2020

Related U.S. Application Data

(60) Provisional application No. 62/746,831, filed on Oct. 17, 2018, provisional application No. 62/746,168, filed on Oct. 16, 2018.

(51) Int. Cl.
*G02B 6/44* (2006.01)

(52) U.S. Cl.
CPC ......... *G02B 6/4441* (2013.01); *G02B 6/4454* (2013.01)

(58) Field of Classification Search
None
See application file for complete search history.

(56) References Cited

U.S. PATENT DOCUMENTS

| | | | |
|---|---|---|---|
| 9,442,266 B2 | 9/2016 | Kowalczyk et al. | |
| 9,502,878 B2* | 11/2016 | Coenegracht | H02G 3/14 |
| 9,952,397 B2* | 4/2018 | Hanson | H02G 3/081 |
| 9,958,628 B2 | 5/2018 | Kowalczyk et al. | |
| 10,401,584 B2 | 9/2019 | Coan et al. | |
| 10,637,220 B2* | 4/2020 | Van Baelen | G02B 6/4454 |
| 10,802,236 B2* | 10/2020 | Kowalczyk | G02B 6/445 |
| 2006/0153362 A1* | 7/2006 | Bloodworth | G02B 6/4448 |
| | | | 379/413.02 |
| 2007/0272440 A1* | 11/2007 | Grunwald | H01R 9/2425 |
| | | | 174/520 |
| 2011/0013875 A1* | 1/2011 | Bran de Leon | G02B 6/445 |
| | | | 385/135 |
| 2016/0091681 A1* | 3/2016 | Hanson | G02B 6/4448 |
| | | | 385/135 |
| 2018/0239098 A1* | 8/2018 | Hanson | G02B 6/4448 |
| 2020/0116964 A1* | 4/2020 | Schurmans | G02B 6/4441 |
| 2020/0124809 A1* | 4/2020 | Kowalczyk | G02B 6/445 |

FOREIGN PATENT DOCUMENTS

WO    2018/202812 A2    11/2018

* cited by examiner

*Primary Examiner* — Rhonda S Peace
(74) *Attorney, Agent, or Firm* — Merchant & Gould P.C.

(57) ABSTRACT

A re-enterable enclosure has a cover arrangement removably disposed within the interior between a rear wall and an access opening to separate the interior into a restricted access region and an unrestricted access region. The cover arrangement extends over the restricted access region to inhibit access to the restricted access region from the access opening. First and second entrances to the restricted access region are provided from the unrestricted access region. The second entrance is different from the first entrance. In some implementations, a termination field is provided at a first side of the restricted access region and a splice tray is provided at a second side of the restricted access region.

19 Claims, 14 Drawing Sheets

— 1 —

ENCLOSURE WITH RESTRICTED ACCESS REGION

CROSS REFERENCE TO RELATED APPLICATIONS

This application claims the benefit of provisional application Ser. No. 62/746,168, filed Oct. 16, 2018 and claims the benefit of provisional application Ser. No. 62/746,831 filed Oct. 17, 2018, which are incorporated herein by reference in their entirety.

BACKGROUND

Fiber optic communication networks are continuously expanding as service providers strive to deliver higher bandwidth communication capabilities to customer. A typical fiber optic communication system includes a network of fiber optic cables suitable for transmitting larger volumes of data and voice signals over relatively long distances. The fiber optic communication systems frequently include components such as enclosures that may house telecommunications equipment such as passive power splitters, wave length division multiplexers, splice trays, fiber optic adapters for interconnecting fiber optic connectors, patch panels, interconnect panels or other components. There is a need for systems, methods and devices for cost effectively expanding fiber optic networks.

Improvements are desired.

SUMMARY

The present disclosure is directed to an enclosure including a housing defining an interior accessible through an access opening; and a cover arrangement removably disposed within the interior of the housing. The cover arrangement separates the interior into a restricted access region and an unrestricted access region. The cover arrangement extends over the restricted access region to block access to any components within the restricted access region from the access opening.

In certain implementations, the restricted region has a first entrance and a separate second entrance that is different from the first entrance. For example, the first entrance may be through an optical adapter and the second entrance may be through an opening at least partially defined by the cover arrangement.

In certain implementations, the cover arrangement extends less than fully across a width of the housing and less than fully across a height of the housing. In certain implementations, the restricted access region extends less than fully across a width of the housing and less than fully across a height of the housing.

In certain implementations, the interior defines a splice region within the restricted access region. In certain implementations, the interior defines a fiber storage region within the restricted access region. In certain implementations, the interior defines part of a termination region within the restricted access region.

In certain examples, a splice region and a fiber storage region are disposed within the restricted access region. In certain examples, a splice region, a fiber storage region, and part of a termination region are disposed within the restricted access region.

A variety of additional inventive aspects will be set forth in the description that follows. The inventive aspects can relate to individual features and to combinations of features.

It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
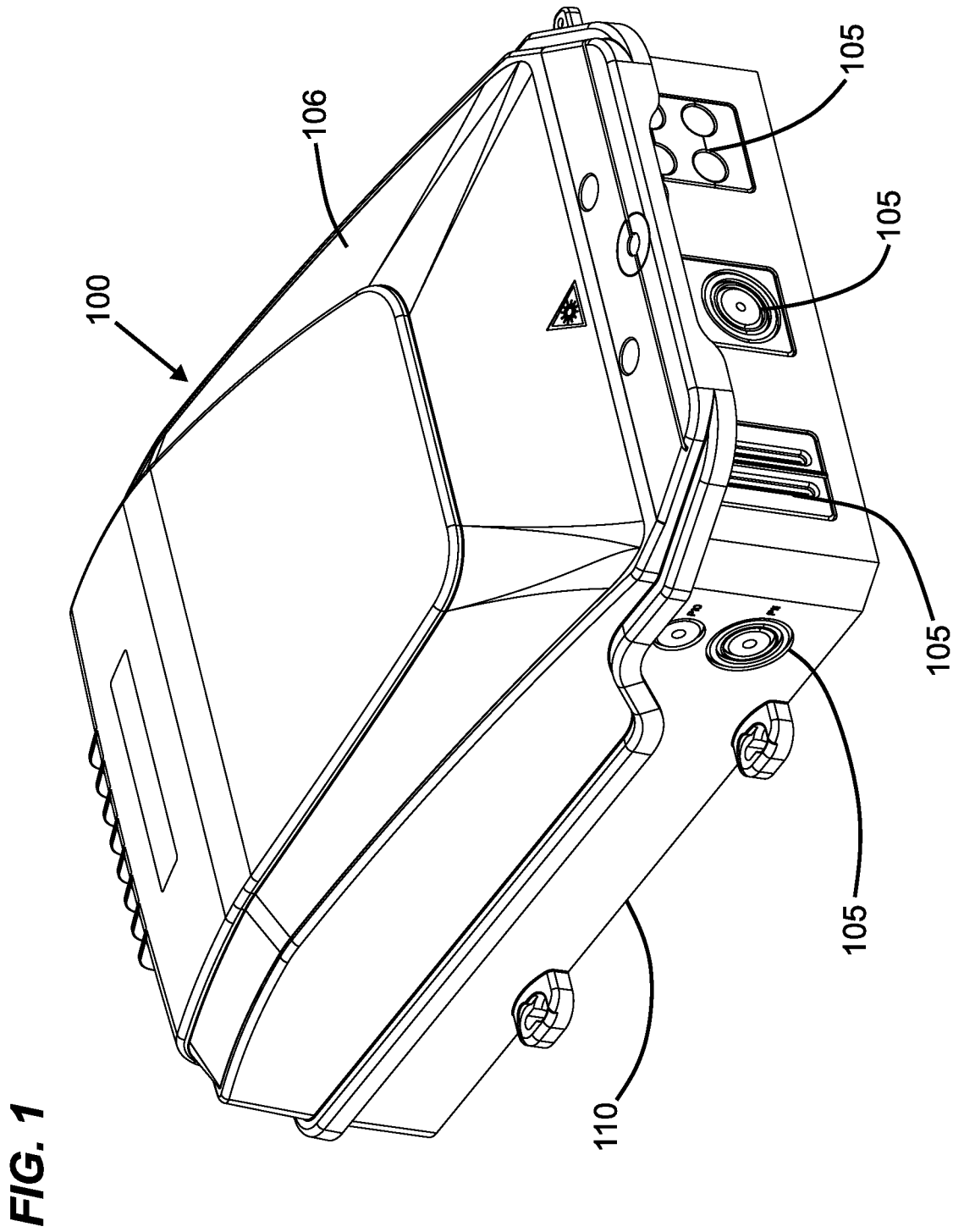
FIG. 1 is a perspective view of a first example enclosure having a restricted access region within the interior.
Figure 2:
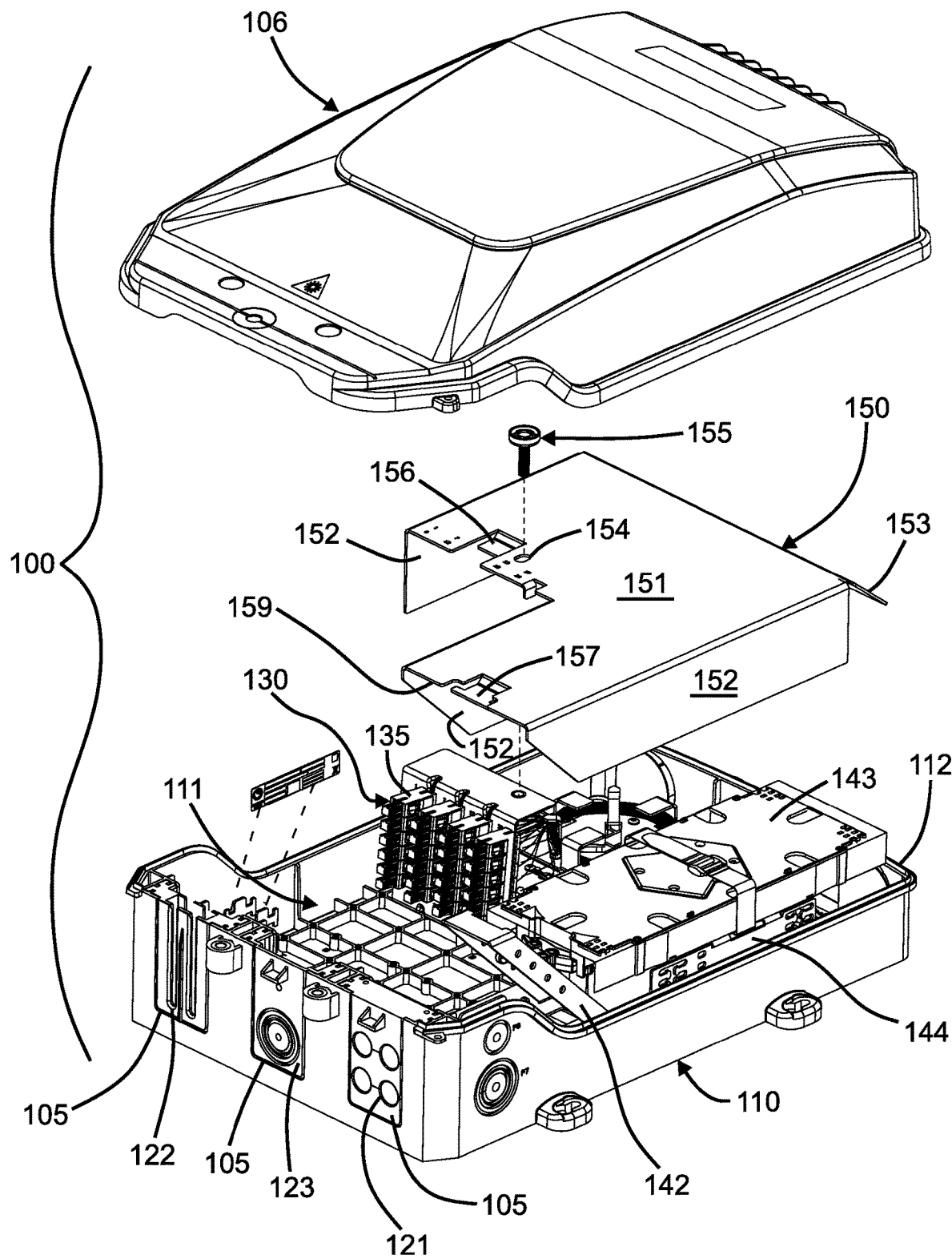
FIG. 2 is an exploded view of the enclosure of FIG. 1.
Figure 3:
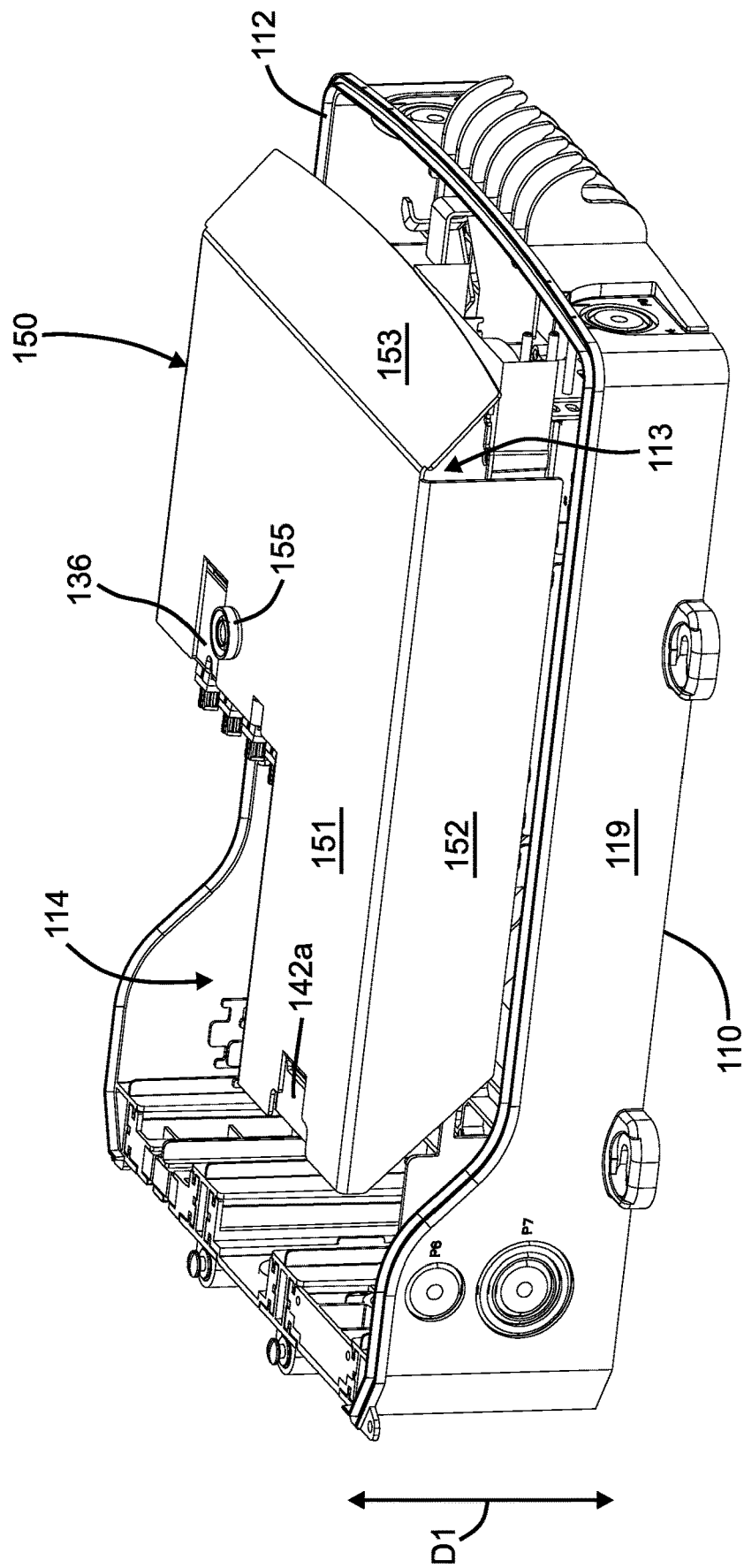
FIG. 3 is a perspective view of the enclosure of FIG. 1 with a door removed to expose a cover arrangement limiting access to a restricted access region.

Reference will now be made in detail to exemplary aspects of the present disclosure that are illustrated in the accompanying drawings. Wherever possible, the same reference numbers will be used throughout the drawings to refer to the same or like parts.

The present disclosure is directed to an enclosure 100, 200 including a housing 110, 210 having a bottom 101, 201, a top 102, 202, a first side 103, 203, and a second side 104, 204. The housing 110, 210 defines an interior 111, 211 accessible through an access opening 112, 212. A cover arrangement 150, 250 is removably disposed within the interior 111, 211 of the housing 110, 210. The cover arrangement 150, 250 separates the interior 111, 211 into a restricted access region 113, 213 and an unrestricted access region 114, 214. The cover arrangement 150, 250 extends over the restricted access region 113, 213 to block access to any components within the restricted access region 113, 213 from the access opening 112, 212.

In certain implementations, the restricted access region 113, 213 has a first entrance 115, 215 and a separate second entrance 116, 216 that is different from the first entrance 115, 215. For example, the first entrance 115, 215 may be through an optical adapter 135, 235 and the second entrance 116, 216 may be through an opening 159, 259 at least partially defined by the cover arrangement 150, 250. In some examples, both entrances 115, 116 face in a common direction. In other examples, the first entrance 215 faces in a different direction than the second entrance 216. For example, the first entrance 215 may be orthogonal to the second entrance 216.

The housing 110, 210 includes a rear wall 118, 218 and a peripheral sidewall 119, 219 extending forwardly of the rear wall 118, 218. The rear wall 118, 218 of the housing 110, 210 extends along a width W1, W2 of the housing 110, 210 and along a height H1, H2 of the housing 110, 210. The sidewall 119, 219 extends along a depth D1, D2 of the housing 110, 210. A forward end of the peripheral sidewall 119, 219 defines the access opening leading to the interior of the housing 110, 210.

The housing 110, 210 defines a cable port 105, 205 in the peripheral sidewall 119, 219. In certain implementations, the housing defines a plurality of cable ports 105, 205 in the peripheral sidewall 119, 219. In certain examples, the peripheral sidewall 119, 219 defines one or more apertures 120, 220 in each of which a cable port arrangement can be mounted. In various implementations, the cable ports 105, 205 are disposed at a bottom 101, 201 of the housing 110, 210, at a top 102, 202 of the housing 110, 210, at a first side 103, 203 of the housing 110, 210, and/or at a second side 104, 204 of the housing 110, 210.

Each cable port arrangement defines a sealing arrangement 121, 122, 123, 221, 222, 223 through which one or more optical cables can extend to enter and/or exit the housing 110, 210. In some implementations, the sealing arrangement 121, 221 includes two or more gel blocks, foam blocks, or other gaskets that cooperate to define cable passages therebetween. In other implementations, the sealing arrangement 122, 222 includes a gel block, foam block, or other gasket defining one or more slits into which cables can be laterally slid. In still other implementations, the sealing arrangement 123, 223 includes a gel block, foam block, or other gasket defining one or more openings with removable plugs to close the openings prior to use.

Figure 4:
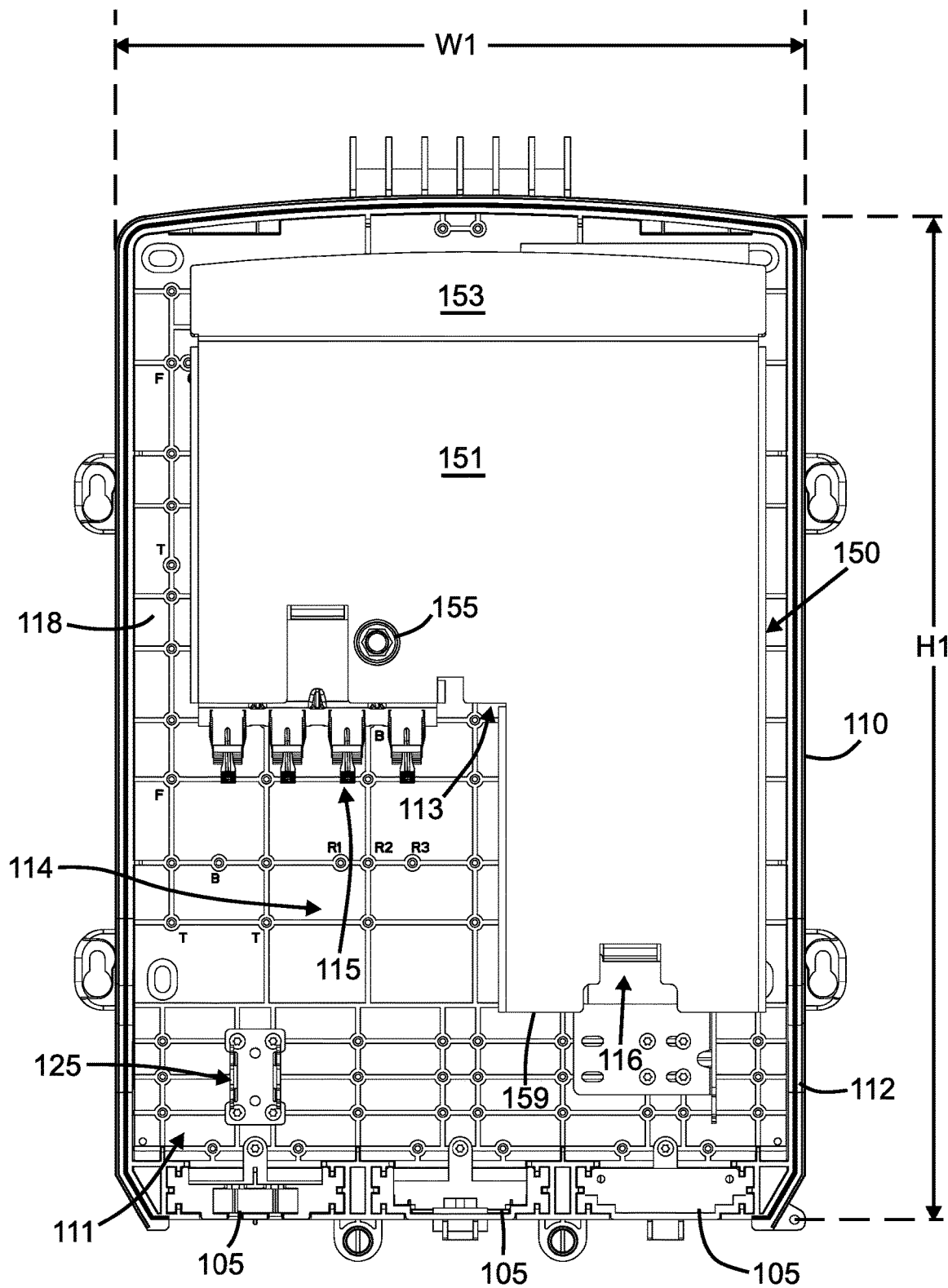
FIG. 4 is a front elevational view of the enclosure of FIG. 3.
Figure 5:
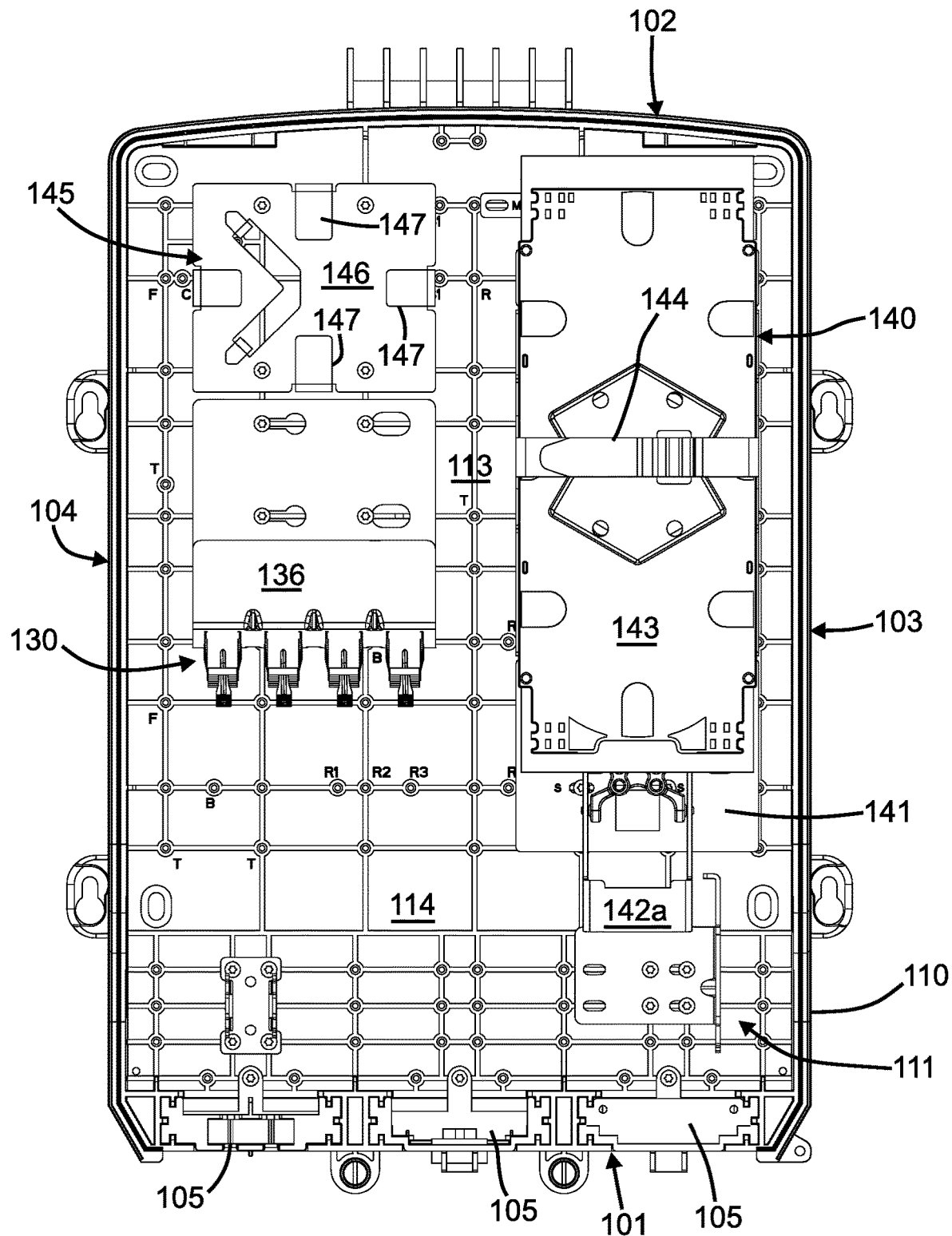
FIG. 5 shows the enclosure of FIG. 4 with the cover arrangement removed so that the restricted access region is visible.
Figure 11:
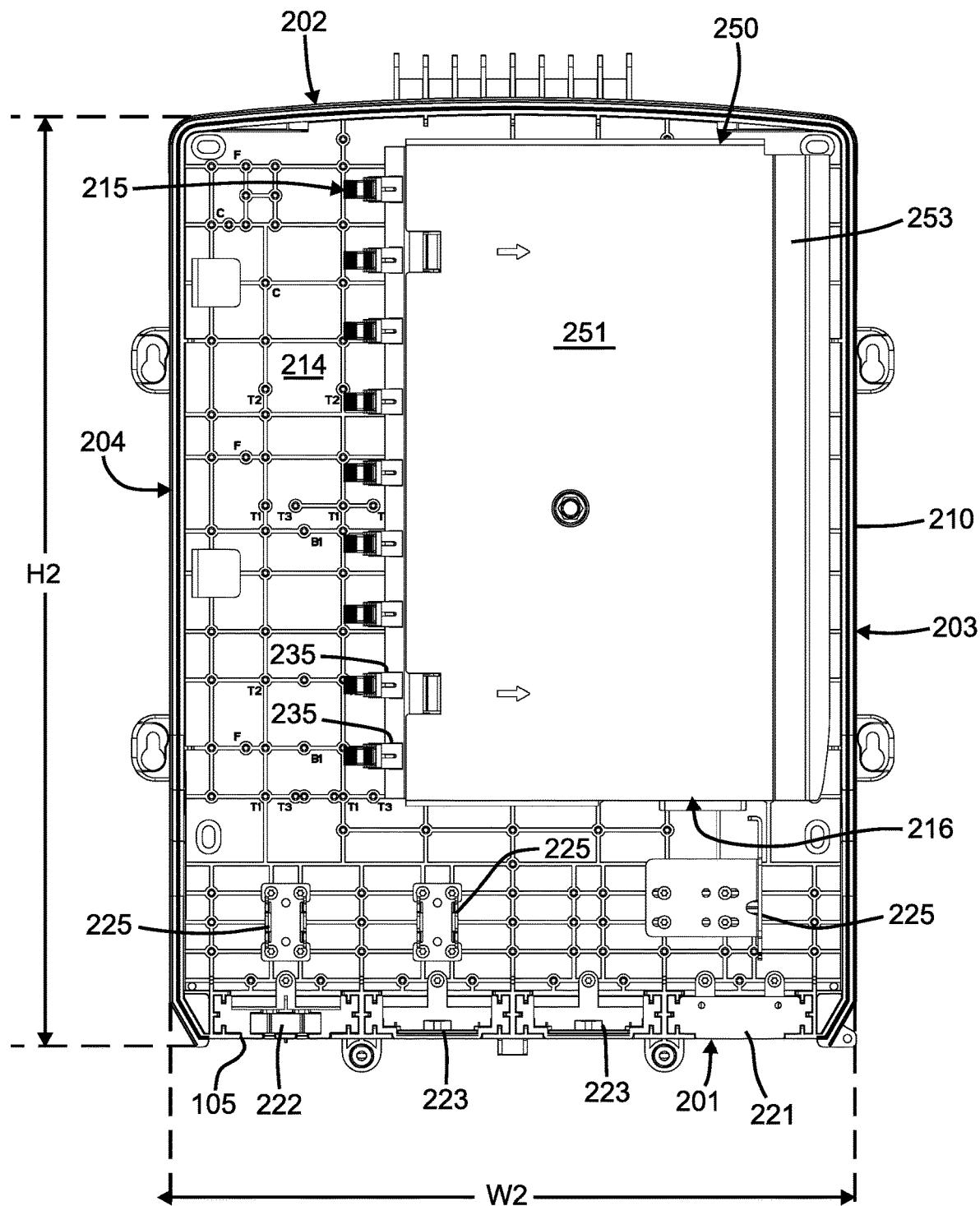
FIG. 11 is a front elevational view of the enclosure of FIG. 10.
Figure 12:
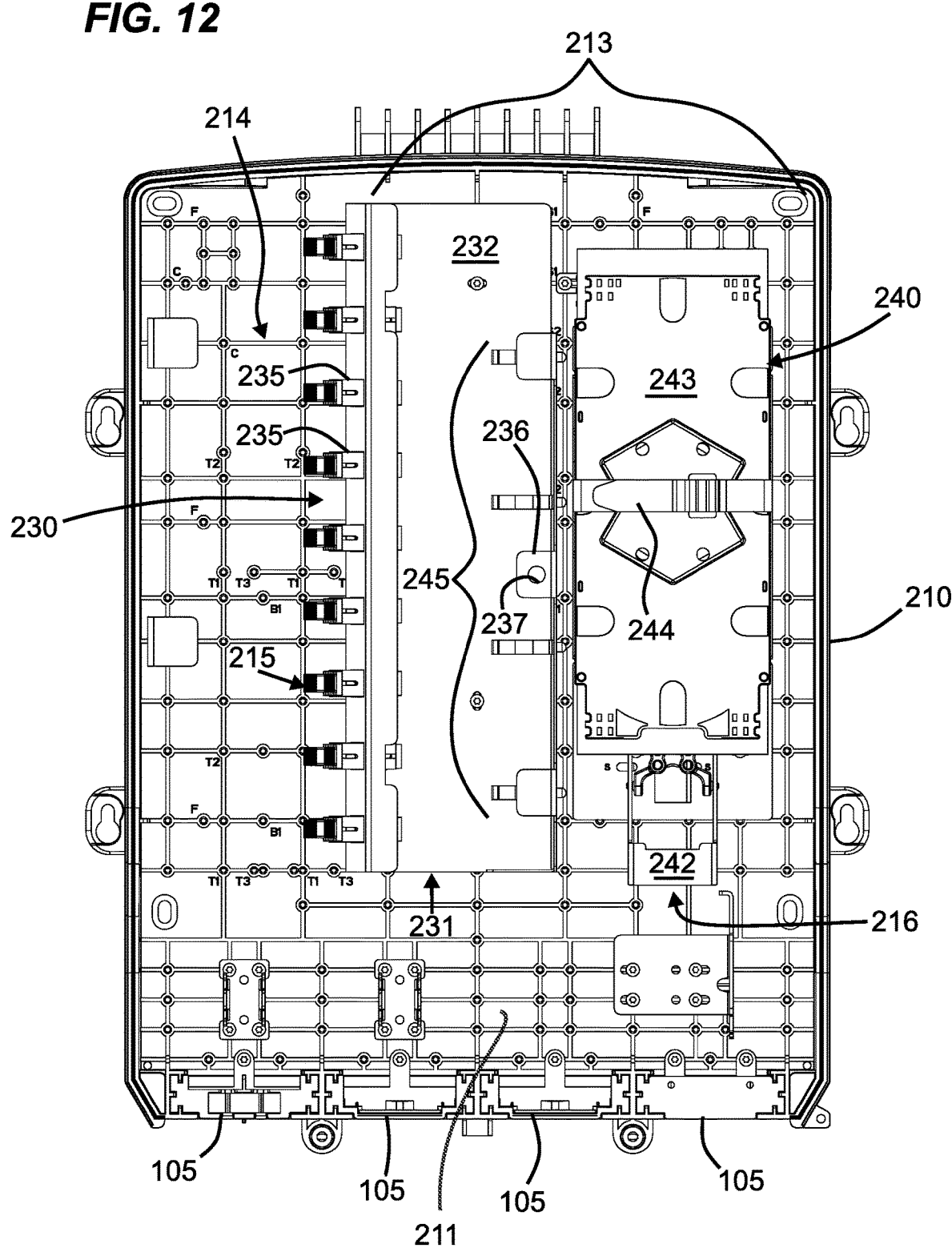
FIG. 12 shows the enclosure of FIG. 11 with the cover arrangement removed so that the restricted access region is visible.
Figure 13:
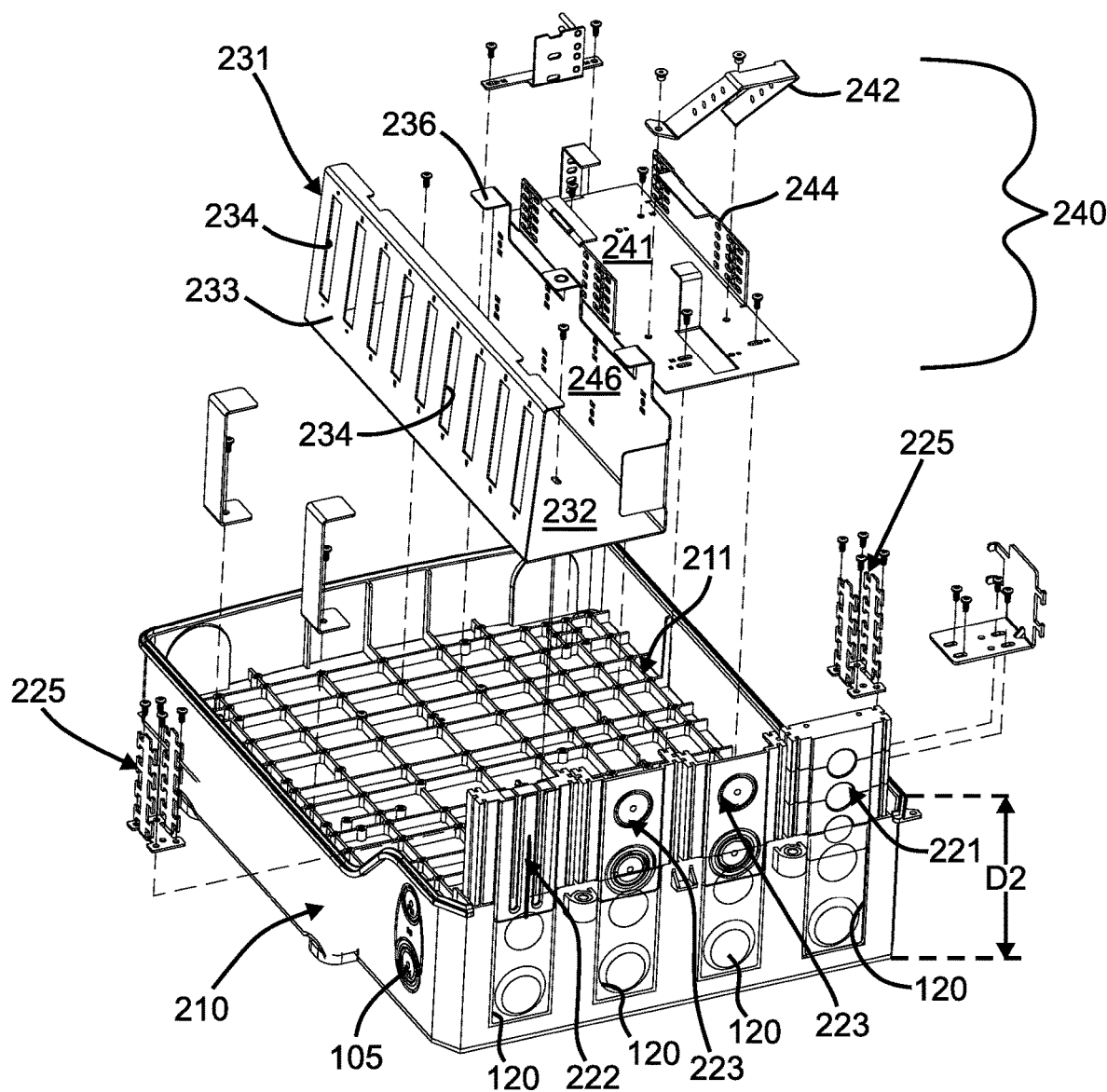
FIG. 13 is a perspective view of a housing of the enclosure of FIG. 8 with a termination panel arrangement, splice tray panel arrangement, and cable port arrangements exploded outwardly.
Figure 14:
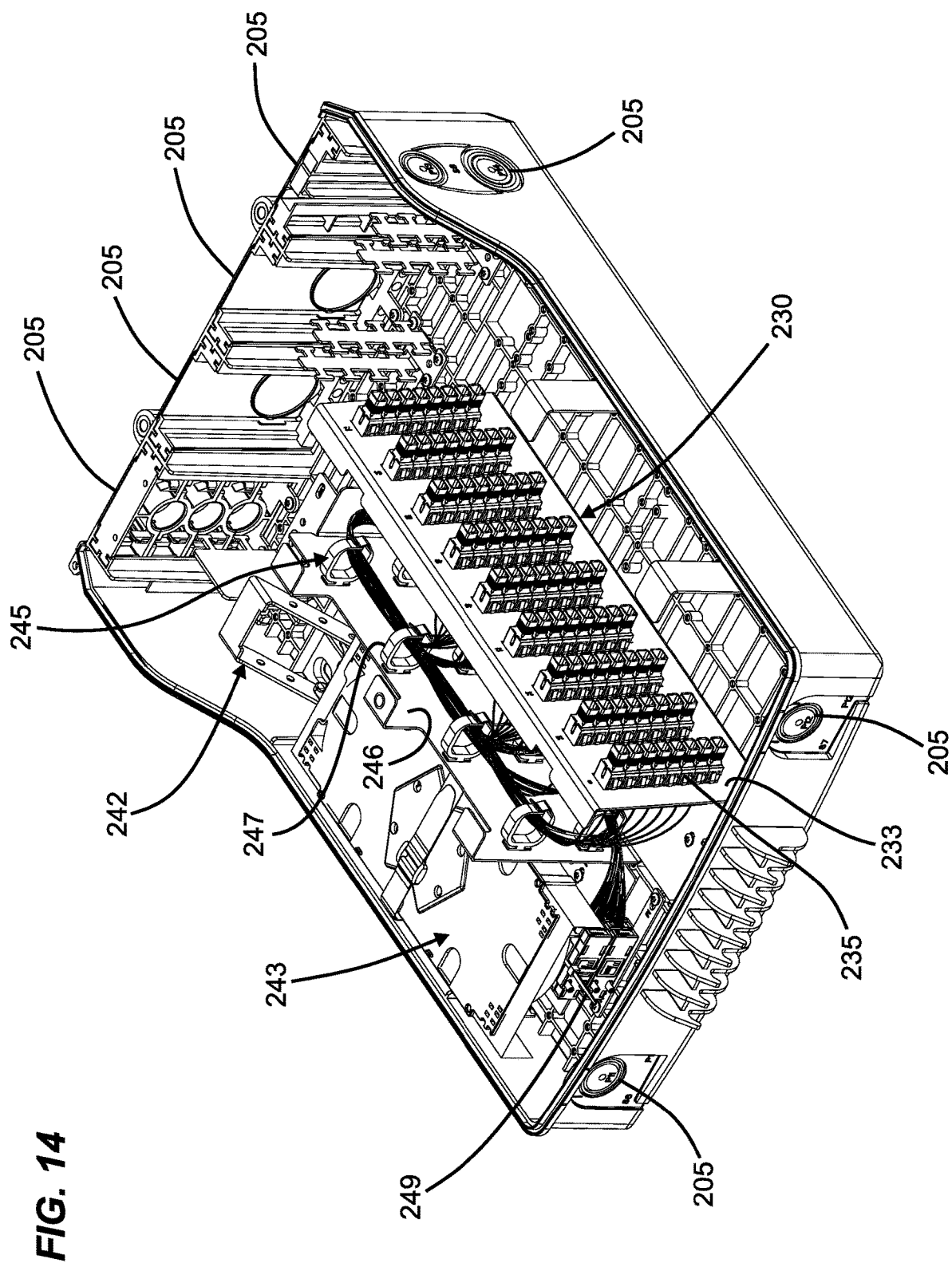
FIG. 14 is a perspective view of the enclosure of FIG. 12 showing pigtail fibers routed between the splice trays and the second ports of the termination adapters.

One or more anchor structures 125, 225 may be disposed within the housing 110, 210 adjacent the cable ports 105 (see FIGS. 4 and 11). Optical fibers may be retained (e.g., using zip ties) at the anchor structures 125, 225.

In certain implementations, a door 106, 206 is coupled to the housing 110, 210 at the access opening 112, 212. The door 106, 206 is movable between a closed position and an open position. The door 106, 206 covers the access opening 112, 212 when in the closed position and uncovers the access opening 112, 212 when in the open position. In some examples, the door 106, 206 pivots relative to the housing 110, 210 between the closed and open positions. In other examples, the door 106, 206 is fully removable from the housing 110, 210 to transition between the closed and open positions.

The cover arrangement 150, 250 is disposed between the rear wall 118, 218 and the access opening 112, 212. In certain implementations, the cover arrangement 150, 250 extends less than fully across a width W1, W2 of the housing 110, 210 and less than fully across a height H1, H2 of the housing 110, 210. In certain implementations, the restricted access region 113, 213 extends less than fully across a width W1, W2 of the housing 110, 210 and less than fully across a height H1, H2 of the housing 110, 210. Accordingly, one or more optical fibers can be routed along a height H1, H2 of the housing 110, 210 between the restricted access region 113, 213 and a peripheral sidewall 119, 219 of the housing 110, 210 and/or can be routed along a width W1, W2 of the housing 110, 210 between the restricted access region 113, 213 and the peripheral sidewall 119, 219.

In certain implementations, the unrestricted access region 114, 214 extends along a majority of the width W1, W2 of the housing 110, 210 at a bottom 101, 201 of the housing 110, 210. In some implementations, the restricted access region 113, 213 extends along a majority of the width W1, W2 of the housing 110, 210 at the top 102, 202 of the housing 110, 210. In certain implementations, at least a portion of the restricted access region 113, 213 extends along a majority of the height H1, H2 of the housing 110, 210.

In some implementations, the restricted access region 113, 213 includes a splice region 140, 240, a fiber storage region 145, 245, part of a termination region 130, 230, or any combination thereof In certain implementations, the first entrance 115, 215 extends through the termination region 130, 230. In certain implementations, the second entrance 116, 216 extends towards the splice region 140, 240. The cover arrangement 150, 250 blocks user access to the splice region 140, 240, the fiber storage region 145, 245, and/or the part of the termination region 130, 230 from the access opening 112, 212. Accordingly, the cover arrangement 150, 250 is removed prior to a user accessing the splice region 140, 240, the fiber storage region 145, 245, and/or the part of the termination region 130, 230 from the access opening 112, 212.

In certain implementations, the splice region 140, 240 is disposed closer to the first side 103, 203 of the housing 110, 210 and the termination region 130, 230 is disposed closer to the second side 104, 204 of the housing 110, 210. In some implementations, the fiber storage region 145 aligns with the termination region 130 along the height H1 of the housing 110. In other implementations, the fiber storage region 245 is disposed between the termination region 230 and the splice region 240.

Figure 6:
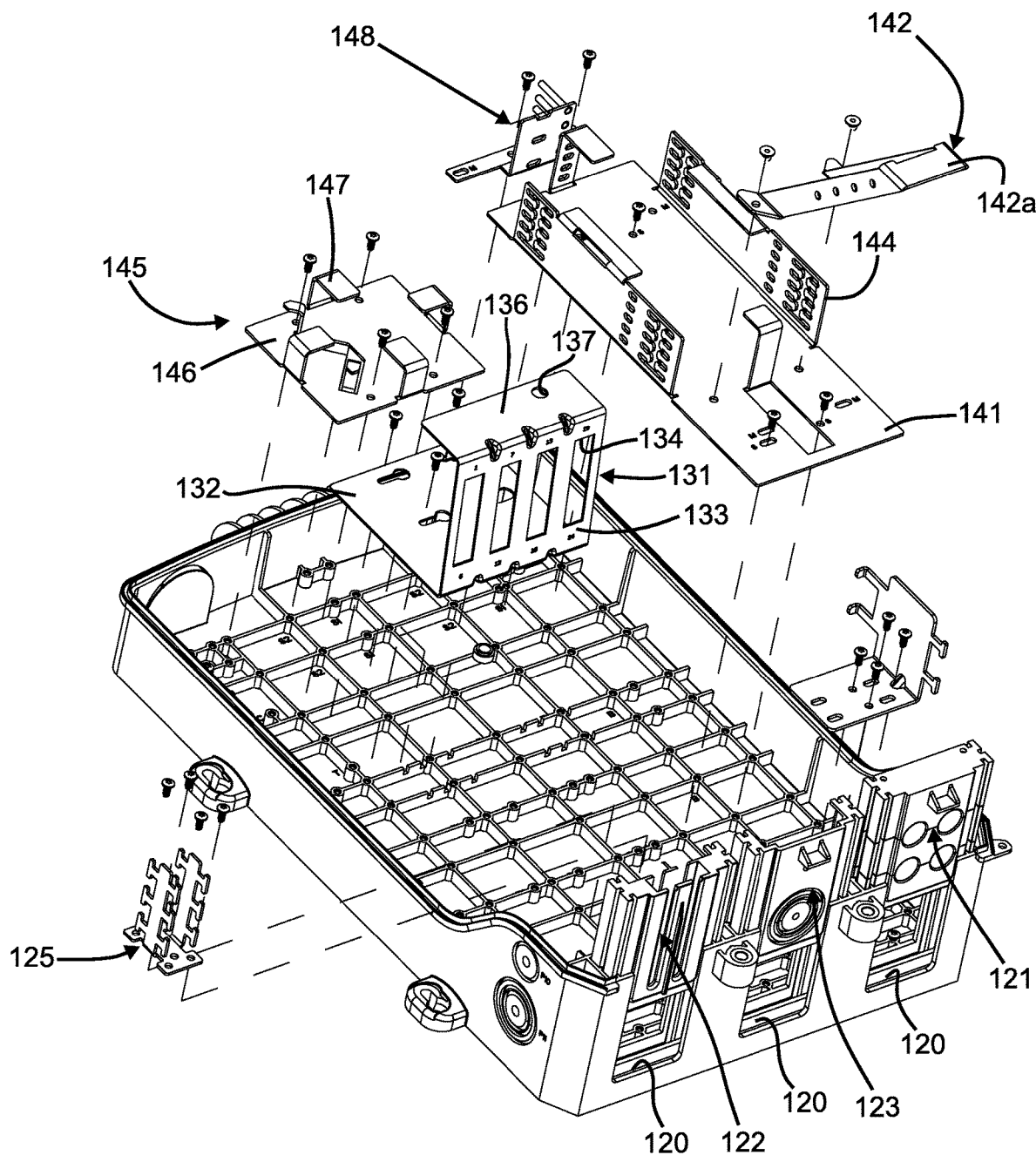
FIG. 6 is a perspective view of a housing of the enclosure of FIG. 1 with a termination panel arrangement, fiber storage arrangement, splice tray panel arrangement, and cable port arrangements exploded outwardly.

One or more splice trays 143, 243 may be mounted at the splice region 140, 240. Each splice tray 143, 243 is configured to hold one or more optical splices (e.g., fusion splices). In certain implementations, the one or more splice trays 143, 243 are held by a tray holder 142, 242. In certain examples, the tray holder 142, 242 is carried by a panel 141, 241 that mounts to the rear wall 118, 218 of the housing 110, 210 or otherwise installs within the housing interior 111, 211. One or more cable anchoring structures 144, 244 (cable tie mounts) may be disposed adjacent the splice trays 143, 243. In certain examples, the cable anchoring structures 144, 244 is carried with the panel 141, 241 (see FIG. 6).

One or more optical adapters 135, 235 can be mounted to a termination panel arrangement 131, 231. The optical adapters 135, 235 each include a first port and a second port. The first port of each optical adapter 135, 235 is accessible from the unrestricted access region 114, 214 and the second port of each optical adapter 135, 235 is accessible from the restricted access region 113, 213. In some implementations, the termination panel arrangement 131 holds the optical adapters 135 so that ports of the adapters 135 face the bottom 101 and top 102 of the housing 110. In other implementations, the termination panel arrangement 231 holds the optical adapters 235 so that all of the ports of the adapters 235 face the first and second sides 203, 204 of the housing 210. In some examples, the insertion axes of the adapter ports extends parallel to the height H1 of the housing 110. In other examples, the insertion axes of the adapter ports extend parallel to the width W2 of the housing 210.

The termination panel arrangement 131, 231 mounts to the rear wall 118, 218 of the housing 110, 210 or otherwise installs within the housing interior 111, 211. For example, in certain implementations, the termination panel arrangement 131, 231 includes a mounting panel 132, 232 that couples to the housing 110, 210 (e.g., to the rear wall 118, 218) and a windowed panel 133, 233 defining apertures or windows 134, 234 that holds the adapters 135, 235. The termination panel arrangement 131, 231 also may include a mounting flange 136, 236 at which the cover arrangement 150, 250 attaches to the termination panel arrangement 131, 231 (e.g., using fastener 155, 255).

In certain implementations, the windowed panel 133, 233 extends across less than a full width W1, W2 of the housing 110, 210. In certain examples, the windowed panel 133, 233 extends across no more than half of the width W1, W2 of the housing 110, 210. In certain examples, the windowed panel 133, 233 extends across no more than a third of the width W1, W2 of the housing 110, 210. In certain examples, the windowed panel 133, 233 extends across no more than a fourth of the width W1, W2 of the housing 110, 210. In certain implementations, the windowed panel 133, 233 extends across less than a full height H1, H2 of the housing 110, 210. In certain examples, the windowed panel 233 extends across at least half of the height H2 of the housing 210. In certain examples, the windowed panel 233 extends across a majority of the height H2 of the housing 210.

Figure 7:
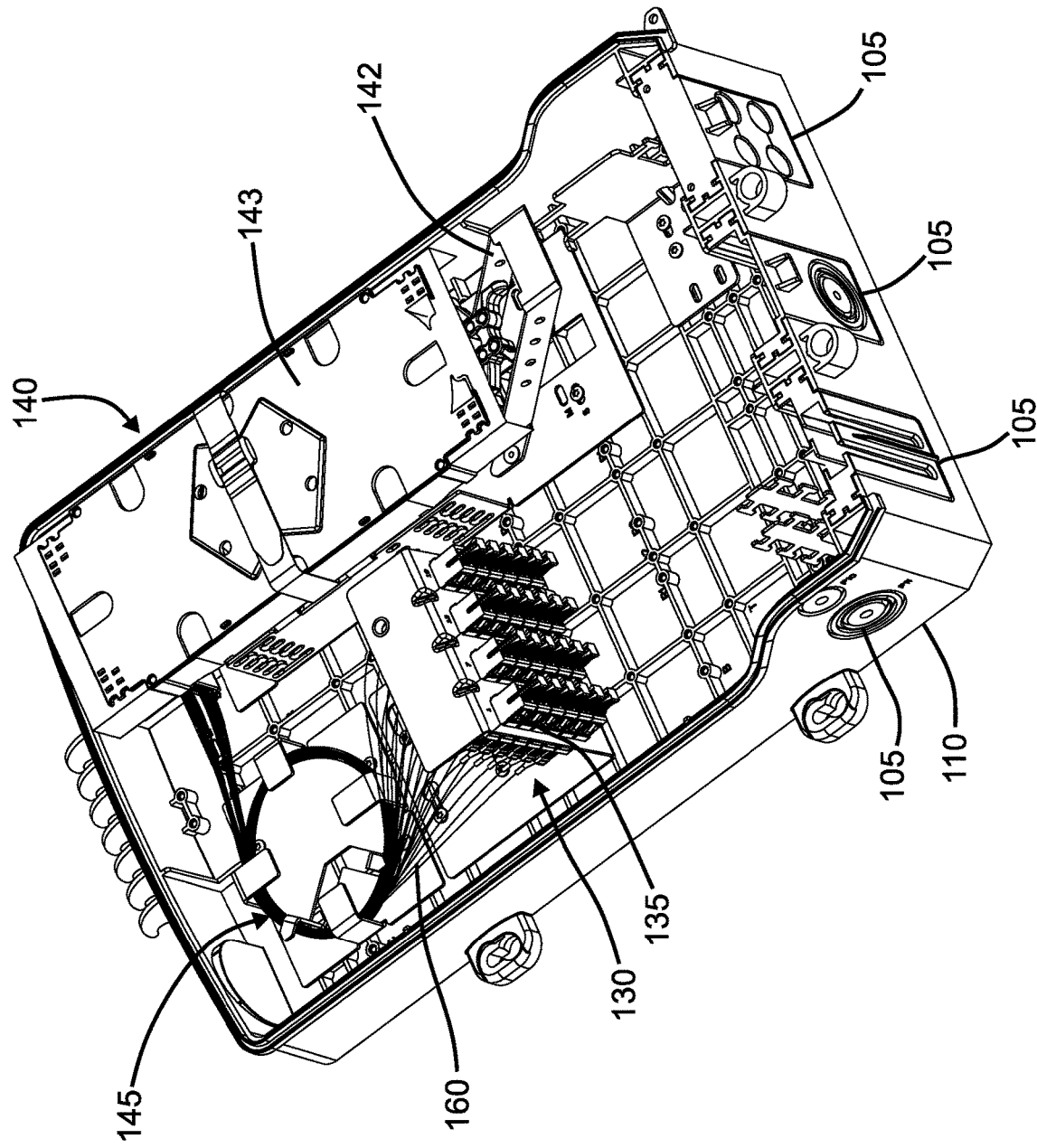
FIG. 7 is a perspective view of the enclosure of FIG. 5 showing pigtail fibers routed between the splice trays and the second ports of the termination adapters.
Figure 8:
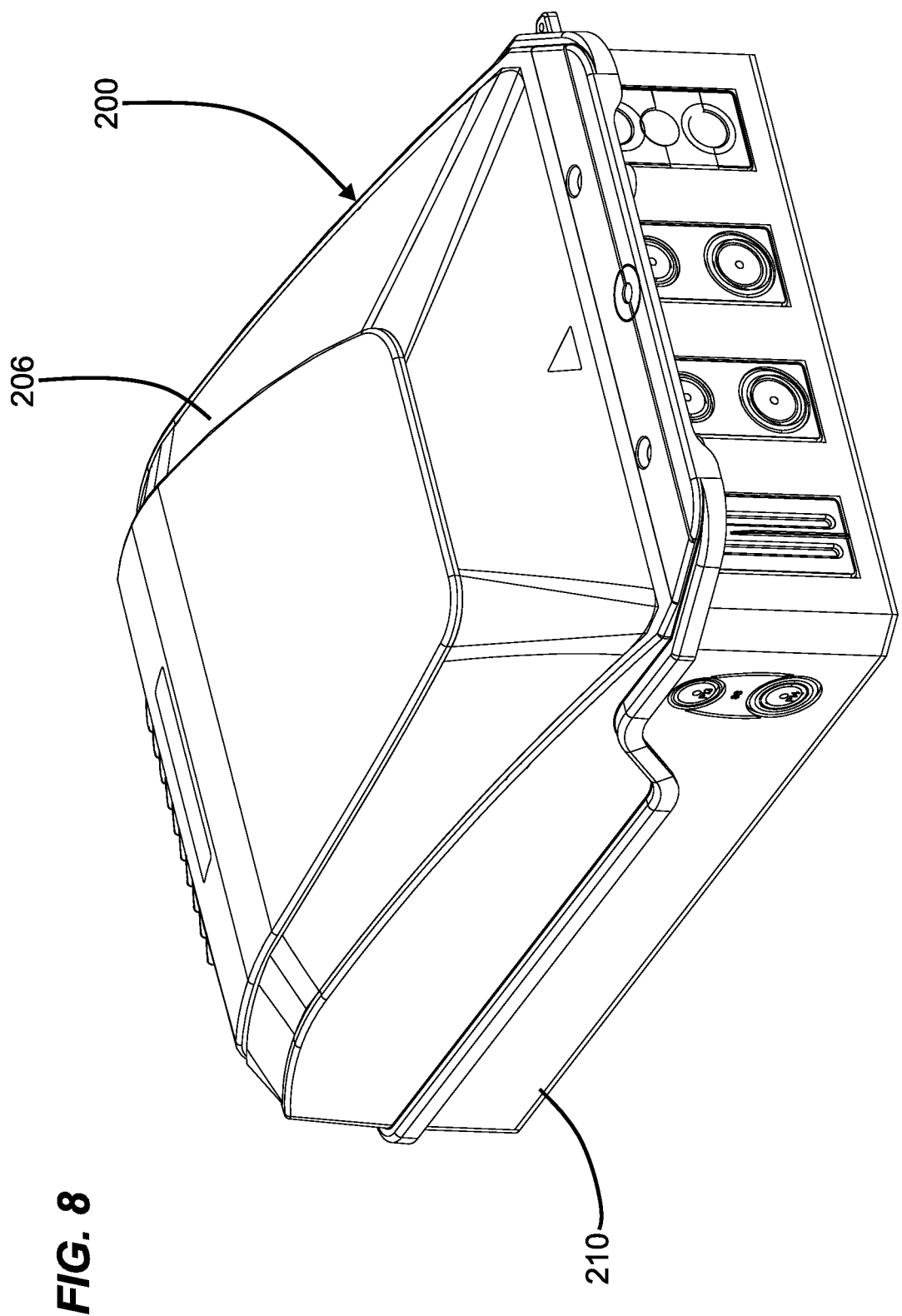
FIG. 8 is a perspective view of a second example enclosure having a restricted access region within the interior.
Figure 9:
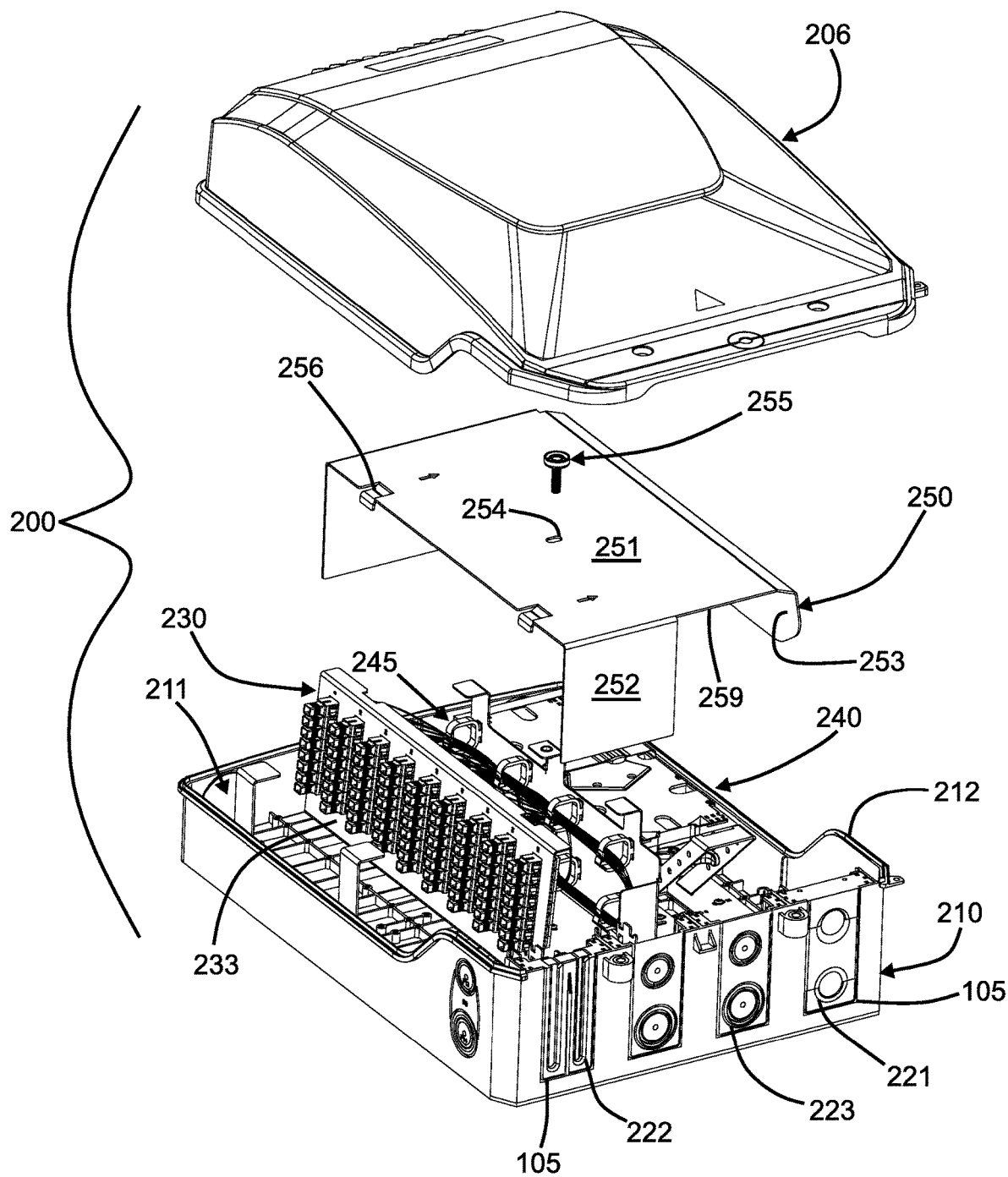
FIG. 9 is an exploded view of the enclosure of FIG. 8.
Figure 10:
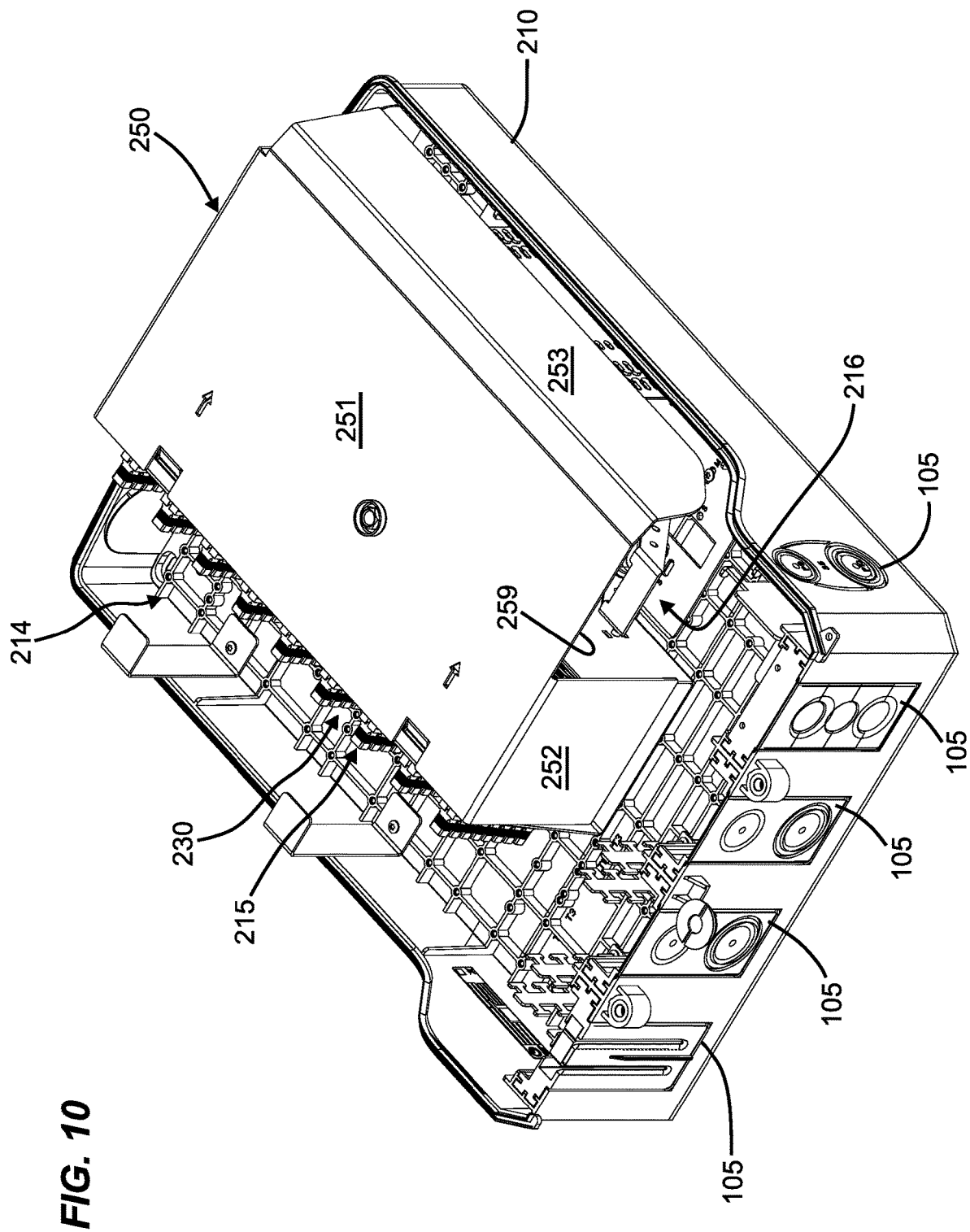
FIG. 10 is a perspective view of the enclosure of FIG. 9 with the door removed to expose a cover arrangement limiting access to a restricted access region.

A fiber storage region 145, 245 manages optical fibers 160, 260 routed between the optical adapters 135, 235 and the splice trays 143, 243. In certain implementations, the fiber storage region 145, 245 is wholly disposed between the termination region 130, 230 and the splice region 140, 240. In certain implementations, one or more management guides 147, 247 are carried on a storage plate 146, 246 that can be installed within the housing 110, 210 (e.g., at the rear wall). The guide members 147, 247 hold the optical fibers 160, 260 in one or more coils between the termination region 130, 230 and the splice region 140, 240 (e.g., see FIG. 7). In some examples, the guide members include retention fingers 147 that hold one or more coils of optical fibers 160 generally parallel to the rear wall 118. In other examples, the guide members include loop members 247, bend radius limiters, or other such structures that route the optical fibers 260 in coils generally parallel with the peripheral wall 219.

FIGS. 1-7 illustrate a first example enclosure 100 including a housing 110 defining cable ports 105 with three different types of sealing arrangements 121, 122, 123. In other examples, however, the same type of sealing arrangement can be used at each cable port 105. In still other examples, the housing 110 may define a greater or lesser number of cable ports 105. In the example shown, the housing 110 includes additional cable ports 105 at the sides 103, 104 towards the bottom 101 and at the top 102 towards the sides 103, 104.

A first example splice panel arrangement is configured to be installed within the housing 110 separate from the termination panel arrangement 131. The splice panel arrangement includes a mounting panel 141 that attaches (e.g., using fasteners) to the rear wall 118 of the housing 110. In certain examples, the mounting panel 141 defines multiple fastener apertures to accommodate installing the mounting panel 141 within different sized housings or housings with different internal configurations. A splice tray holder 142 mounts to the panel 141. One or more splice trays 143 mount (e.g., pivotally mount) to the tray holder 142. In certain examples, cable anchor members 144 are carried by the mounting panel 141. For example, flanges may extend upwardly from the mounting panel 141 to define structures at which fibers can be anchored (e.g., using zip ties). A fanout holder 148 also may be attached to the splice panel arrangement. One or more fanouts may be mounted to the fanout holder 148.

A first example termination panel arrangement 131 is configured to be installed within the housing 110. The termination panel arrangement 131 includes a mounting panel 132 that attaches (e.g., using fasteners) to the rear wall 118 of the housing 110. A windowed panel 133 extends upwardly from the mounting panel 132. In certain examples, the windowed panel 133 is angled relative to the mounting panel 132. In an example, the windowed panel 133 is orthogonal to the mounting panel 132. In some examples, each window 134 holds multiple adapters 135. In other examples, separate windows 134 may be provided for each adapter 135. A locking flange 136 extends from a top of the windowed panel 133. In an example, the locking flange 136 extends parallel with the mounting panel 132. The locking flange 136 defines a fastener aperture 137.

A first example storage panel arrangement is configured to be installed within the housing 110 separate from the termination panel 131. The storage panel arrangement is configured to be installed separate from the splice panel arrangement. The storage panel arrangement includes a storage panel 146 carrying one or more management members 147. In the example shown, the management members 147 include retention fingers that extend upwardly from the storage panel 146 and inwardly at distal ends. One or more loops of optical fibers may be stored in a coil between the retention fingers.

A first example cover arrangement 150 is configured to be removably mounted within the housing 110 to cover the restricted region 113. The cover arrangement 150 includes a cover member 151 that extends over the restricted region 113. In certain examples, the cover member 151 is generally parallel with the rear wall 118. In certain examples, the cover member 151 defines a fastener aperture 154 that aligns with the fastener aperture 137 of the locking flange 136 of the termination panel arrangement 131 when the cover arrangement 150 is mounted over the restricted access region 113. A fastener 155 can be inserted through the fastener apertures 154, 137 to hold the cover member 151 over the restricted region 113.

In certain implementations, the cover arrangement 150 includes covering flanges 152 extending generally downwardly from the cover member 151 to further limit access to the restricted access region 113. For example, covering flanges 152 may extend downwardly from the cover member 151 at opposite ends of the windowed panel 133 of the termination panel arrangement 131. In certain implementations, another covering flange 152 may extend downwardly from an intermediate portion of the cover member 151. Another covering flange 153 extends at least partially downwardly from a top end of the cover member 151 adjacent the top 102 of the housing 110. In certain examples, the covering flange 153 is angled to also extend partially outwardly towards the top 102 of the housing 110.

In certain implementations, the cover arrangement 150 has a first open section that seats at the termination region 130 and a second open section that seats at the splice region 140. The first open section frames the windowed panel 133 and provides access to the adapters 135. The second open section defines the second entrance 116, which leads to the splice trays 143. In certain examples, the first open section is configured to attach to the termination panel arrangement 131 and the second open section is configured to attach to the splice tray holder 142 or other component at the splice region 140. For example, the cover member 151 includes a first flange 156 that cooperates with the cover member 151 to hold the mounting flange 136 of the termination panel arrangement 131 therebetween. In examples, the cover member 151 includes a second flange 157 that cooperates with the cover member 151 to hold a portion 142a of the tray holder 142 therebetween.

FIGS. 8-14 illustrate a second example enclosure 200 including a housing 210 defining cable ports 205 with three different types of sealing arrangements 221, 222, 223. In other examples, however, the same type of sealing arrangement can be used at each cable port 205. In still other examples, the housing 210 may define a greater or lesser number of cable ports 205. In the example shown, the housing 210 includes additional cable ports 205 at the sides 203, 204 towards the bottom 201 and at the top 202 towards the sides 203, 204.

In some examples, a splice panel arrangement installed in the housing 210 is the same or substantially the same as the splice panel arrangement shown installed in the housing 110 in FIGS. 1-7. In other examples, other types of splice panel arrangements can be utilized. A fanout holder also may be attached to the splice panel arrangement. One or more fanouts 249 may be mounted to the fanout holder.

A second example termination panel arrangement 231 is configured to be installed within the housing 210. The termination panel arrangement 231 includes a mounting panel 232 that attaches (e.g., using fasteners) to the rear wall 218 of the housing 210. A windowed panel 233 extends upwardly from one side of the mounting panel 232. In certain examples, the windowed panel 233 is angled relative to the mounting panel 232. In an example, the windowed panel 233 is orthogonal to the mounting panel 232. In some examples, each window 234 holds multiple adapters 235. In other examples, separate windows 234 may be provided for each adapter 235.

In some implementations, a storage panel arrangement is part of a termination panel arrangement 131. For example, a storage panel 246 extends upwardly from an opposite side of the mounting panel 232 from the windowed panel 233. In certain examples, the storage panel 246 extends generally parallel to the windowed panel 233. In certain examples, the storage panel 246, the windowed panel 233, and the mounting panel 232 cooperate to define a storage trough. One or more management members 247 are disposed on the storage panel 246 to aid in retaining excess fiber length between the adapters 235 and the splice trays 243. A locking flange 236 extends from a top of the storage panel 246. In an example, the locking flange 236 extends parallel with the mounting panel 232. The locking flange 236 defines a fastener aperture 237.

A second example cover arrangement 250 is configured to be removably mounted within the housing 210 to cover the restricted region 213. The cover arrangement 250 includes a cover member 251 that extends over the restricted region 213. In certain examples, the cover member 251 is generally parallel with the rear wall 218. In certain examples, the cover member 251 defines a fastener aperture 254 that aligns with the fastener aperture 237 (FIG. 12) of the locking flange 236 of the termination panel arrangement 231 when the cover arrangement 250 is mounted over the restricted access region 213. A fastener 255 can be inserted through the fastener apertures 254, 237 to hold the cover member 251 over the restricted region 213.

In certain implementations, the cover arrangement 250 includes covering flanges 252 extending generally downwardly from the cover member 151 to further limit access to the restricted access region 213. For example, covering flanges 252 may extend downwardly from the cover member 251 at opposite ends of the windowed panel 233 of the termination panel arrangement 231. In an example, the covering flanges 252 may extend at least between the windowed panel 233 and the storage plate 246 to enclose the storage trough. In an example, one of the covering flanges 252 also extends past the fanout region. Another covering flange 253 extends at least partially downwardly from the cover member 251 adjacent one side 203 of the housing 210. In certain examples, the covering flange 253 is angled to also extend partially outwardly towards the side 203 of the housing 210.

In certain implementations, the cover arrangement 250 has a first open section that seats at the termination region 230 and a second open section that seats at the splice region 240. The first open section frames the windowed panel 233 and provides access to the adapters 235. The second open section defines the second entrance 216, which leads to the splice trays 243. In certain examples, the cover member 251 includes retention tabs 256 configured to snap-fit or otherwise couple to the termination panel arrangement 231.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:
1. An enclosure comprising:
  a housing defining an interior accessible through an access opening, the housing including a rear wall and a peripheral sidewall extending forwardly of the rear wall, the housing defining a cable port in the peripheral sidewall;
  a door coupled to the housing at the access opening, the door being movable between a closed position and an open position, the door covering the access opening when in the closed position, the door uncovering the access opening when in the open position;
  a cover arrangement removably disposed within the interior of the housing between the rear wall and the access opening to separate the interior into a restricted access region and an unrestricted access region, the cover arrangement extending over the restricted access region;
  a first entrance to the restricted access region from the unrestricted access region;
  a second entrance to the restricted access region from the unrestricted access region, the second entrance being different from the first entrance; and
  a splice tray holder disposed in the restricted access region, the splice tray holder being configured to receive a plurality of splice trays.
2. The enclosure of claim 1, wherein the first entrance includes an adapter port.
3. The enclosure of claim 2, wherein the second entrance includes an opening defined between the cover arrangement and the rear wall of the housing.

4. The enclosure of claim 2, wherein the adapter port faces the cable port.

5. The enclosure of claim 2, wherein the adapter port faces generally orthogonal to the cable port.

6. The enclosure of claim 1, further comprising a splice tray mounted to the splice tray holder, the splice tray being configured to hold one or more optical splices.

7. The enclosure of claim 6, wherein the splice tray is one of a plurality of splice trays mounted at the splice tray holder.

8. The enclosure of claim 1, wherein the first entrance leads to the splice tray holder within the restricted access region.

9. The enclosure of claim 1, further comprising a termination panel holding a plurality of optical adapters, each of the optical adapters having a first port and a second port, the first port being accessible from the unrestricted access region, each of the second ports being accessible from the restricted access region, wherein the cover arrangement blocks access to the second ports from the access opening when disposed within the interior of the housing.

10. The enclosure of claim 9, wherein the first port of a first of the optical adapters defines the second entrance to the restricted access region.

11. The enclosure of claim 9, wherein the termination panel includes opposite major surfaces extending between opposite edges, and wherein the opposite major surfaces extend along less than a full cross-dimension of the housing so that optical fibers can be routed between one of the edges of the termination panel and the peripheral sidewall of the housing.

12. The enclosure of claim 9, wherein the cross-dimension is a width of the housing.

13. The enclosure of claim 9, wherein the cross-dimension is a height of the housing.

14. The enclosure of claim 9, further comprising fiber management structure disposed in the restricted access region, the fiber management structure being disposed between the termination panel and the splice tray holder.

15. The enclosure of claim 14, wherein the fiber management structure is configured to hold a coil of optical fibers between the termination panel and the splice tray holder.

16. The enclosure of claim 9, wherein the termination panel is mounted within the housing separately from the splice tray holder.

17. The enclosure of claim 9, wherein the cover arrangement is configured to be locked to the termination panel.

18. The enclosure of claim 1, wherein the cable port is one of a plurality of cable ports.

19. The enclosure of claim 1, wherein the cover arrangement includes a major surface that extends generally parallel to the access opening and at least one flange extending rearwardly from the major surface to assist in blocking access to the restricted access region.

* * * * *